UNITED STATES PATENT OFFICE.

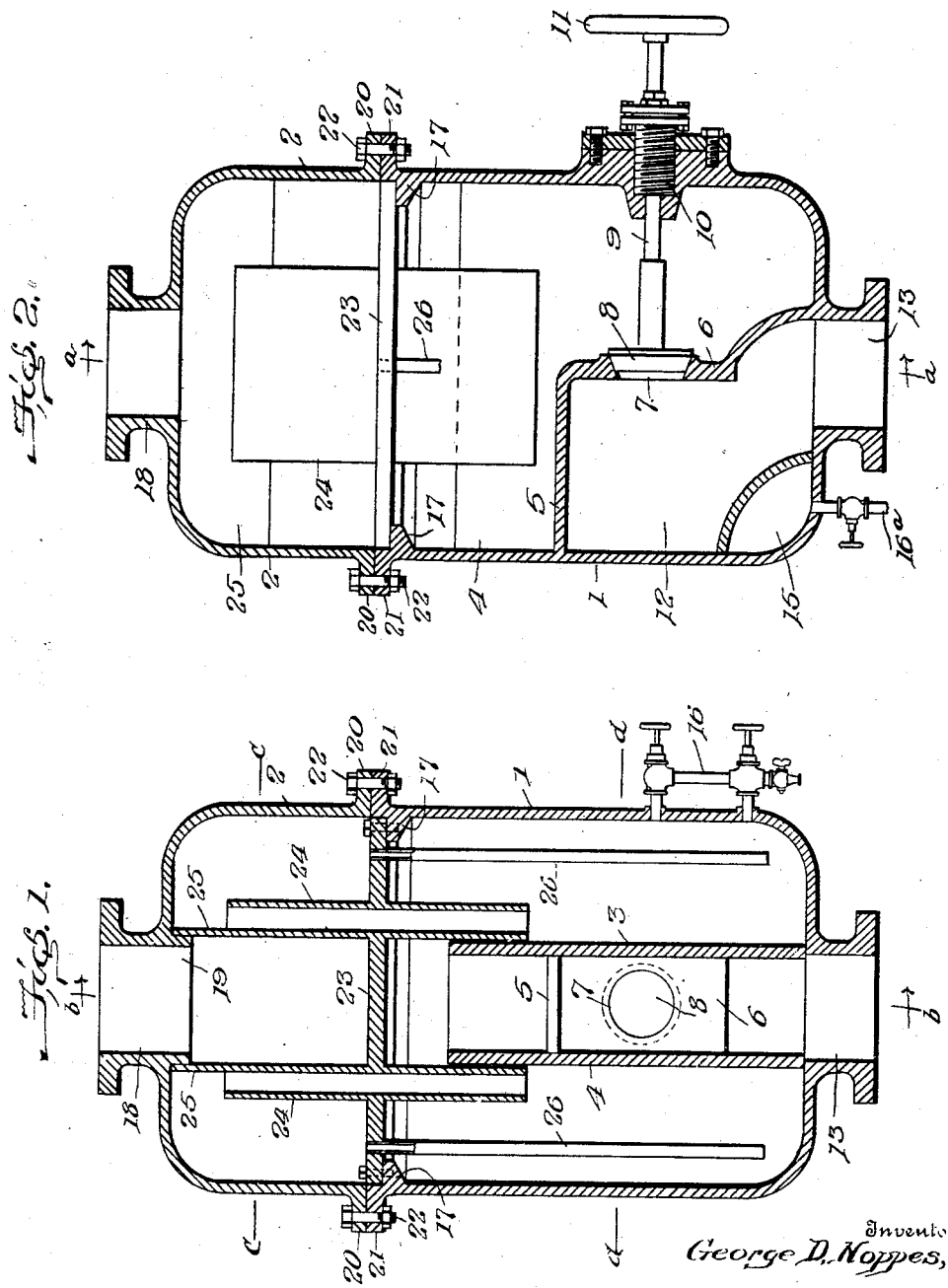

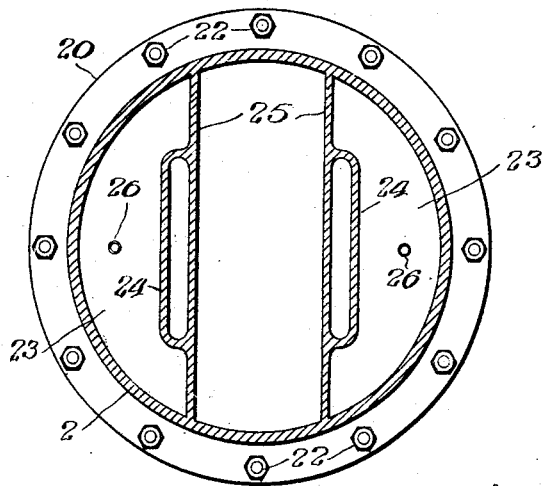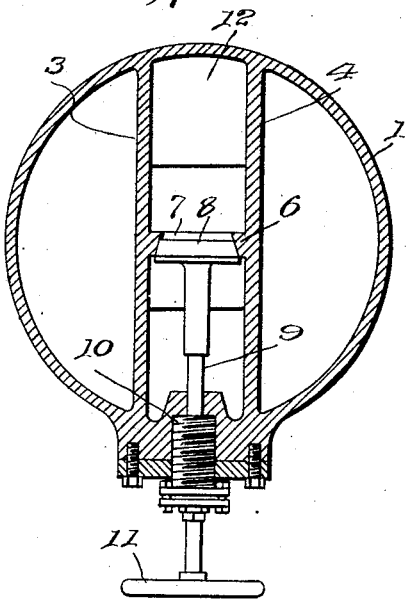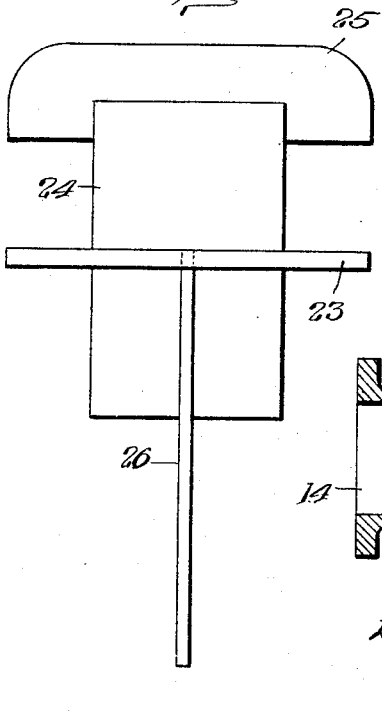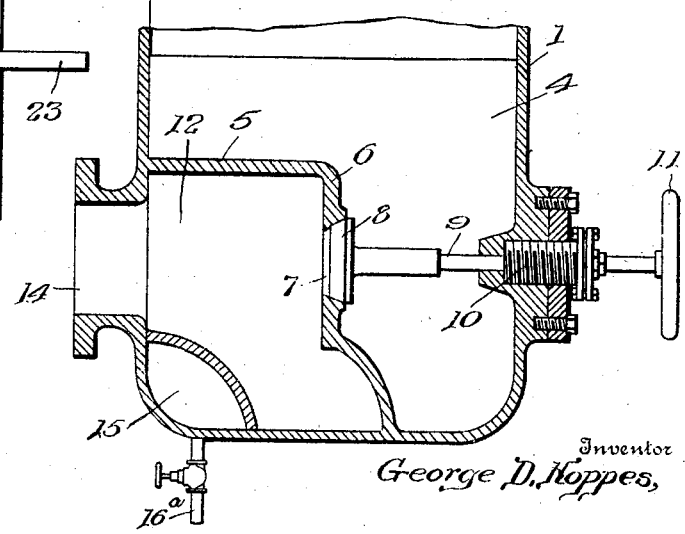

GEORGE D. HOPPES, OF SPRINGFIELD, OHIO.

STEAM-SEPARATOR.

No. 866,725.　　　　Specification of Letters Patent.　　　　Patented Sept. 24, 1907.

Application filed February 1, 1907. Serial No. 355,186.

*To all whom it may concern:*

Be it known that I, GEORGE D. HOPPES, a citizen of the United States, residing at Springfield, in the county of Clark and State of Ohio, have invented certain new and useful Improvements in Steam-Separators, of which the following is a specification, reference being had therein to the accompanying drawings.

The present invention relates to steam separators of the type adapted to be interposed between the source of steam supply and the engine to free the steam from moisture and from foreign matter, such as the water of condensation, oil, etc.

The object of the invention is to provide a separator of this character which will free the steam from moisture and foreign substances by centrifugal action and will deliver the same in a clean, dry condition to the engine or other point of consumption; to provide such a device which will be comparatively simple of construction, being adapted to be cast or otherwise formed in a few parts which can be readily assembled; and further to provide such a device with a receiver for the matter separated from the steam and with a valve controlling the passage of steam through the same.

With these objects in view my invention consists in certain novel features of construction hereinafter to be described, and then more fully pointed out in the claims.

In the accompanying drawings, Figure 1 is a vertical section taken on the line $a\,a$ of Fig. 2; Fig. 2 is a vertical section taken on the line $b\,b$ of Fig. 1, with a part of the interior mechanism in elevation; Fig. 3 is a transverse section taken on the line $c\,c$ of Fig. 1; Fig. 4 is a transverse sectional view taken on the line $d\,d$ of Fig. 1; Fig. 5 is a detail view of the division plate and the tubes extending through the same; and Fig. 6 is a detail sectional view of the lower portion of the casing showing a slightly modified form of the same.

In these drawings, I have illustrated one embodiment of my invention, which, in its preferred form, comprises a casing consisting of a lower part 1 and an upper part 2, these parts being preferably cast, or otherwise formed, separately. The lower portion 1, which is preferably cylindrical in cross section and has its bottom formed integral therewith, is provided with two parallel and vertically extending partitions 3 and 4 which are secured to the bottom of the casing, preferably near the center thereof, and extend upwardly to a point slightly below the upper end of the casing. These partitions extend from side to side of the casing and divide the same into three chambers, the chamber lying between the partitions 3 and 4 being divided into two compartments by a partition or division plate 5 located some distance below the upper ends of the partitions and extending to a point near the center thereof, thence downward to the bottom of the casing. The vertical portion 6 of the partition 5 is provided with a valve seat 7 adapted to receive a valve 8, mounted on a suitable rod 9, extending through a stuffing box 10, and provided on its outer end with suitable controlling means, such as a hand wheel 11. The chamber 12, which is inclosed by the partition 5, is provided with an outlet 13 which is preferably formed through the bottom of the casing and provided with suitable means for connecting the same with the engine, but this outlet may be located at any convenient point communicating with the chamber, such as that shown at 14 in Fig. 6. The chambers formed on the outer sides of the partitions 3 and 4 form receivers for the foreign matter separated from the steam and are preferably connected by a passage 15 formed beneath the partitions 3 and 4 and serving to equalize the pressure in the two chambers. One of these chambers is provided with the usual water gage 16 and blow off valve 16$^a$. The partitions 3, 4 and 5 are preferably cast integral with the lower portion of the casing, but may be formed in any suitable manner.

The casing 1 is further provided near its upper edge with an inwardly extending shoulder 17. The upper part 2 of the casing is in the nature of a cap or continuation of the lower portion 1 and is provided at its upper end with an inlet 18, adapted to be connected with a source of steam supply. This inlet is preferably surrounded by an inwardly extending annular flange 19. The two parts of the casing may be united in any suitable manner, but that preferred is to provide the two parts with flanges 20 and 21 adapted to be connected by suitable bolts 22, thereby forming a rigid connection between the two parts, but allowing the same to be readily separated when it is desired to gain access to the interior of the separator. The parts 1 and 2 of the casing are separated by a division plate 23, thereby forming the casing into two compartments. This division plate preferably conforms in diameter and contour to the shape of the casing and is supported by the inwardly extending flange 17 carried by the lower part 1 of the casing and may be secured thereto, if desired, in any suitable manner. This division plate forms a steam tight partition between the two compartments which are connected by vertically extending pipes 24, which are preferably in the shape of flattened tubes, as shown in Fig. 3, and extend through the partition 23 and beneath the same to a point below the upper edges of the partitions 3 and 4 and above the same to a point near the top of the upper casing 2. These pipes are preferably located on opposite sides of the center of the division plate and thus have their upper ends located on opposite sides of the centrally arranged inlet 18. The upwardly extending pipes 24 are provided at their upper ends with shields 25 which extend from side to side of the casing and from the upper portion of the pipes 24 to the top of the casing, thus preventing the incoming steam from entering directly into the pipes 24 and causing the same to move downwardly below the shields 25 and the tops of the pipes 24, where it is caused to pass around the edges of the pipes, thence upward and over the edges of the pipes into the same, thus dividing the steam into four parts and causing each part to make two short turns. The velocity of the steam as it passes around these turns is such as to throw off any heavy particles, such as water or other foreign substance, thereby allowing the steam to pass through the pipes 24 into the lower compartment in a comparatively dry condition. The division plate 23 is also provided with drain pipes 26 extending through the same and downward to a point near the bottom of the lower compartment, thus connecting the upper compartment with the lower and permitting the water and other foreign matter to drain from that compartment to the receivers in the lower compartment. The diameter of these pipes is very small, and, as the lower ends are immersed in the water in the receivers, little or no steam escapes through the same. As the steam passes through the pipes 24 into the lower compartment it is carried beneath the tops of the partitions 3 and 4 and is obliged to make a sharp turn upwardly and thence downwardly over the edge of the partition to gain the interior of the chamber formed thereby, thus throwing off any particles of moisture which may have adhered thereto in the passage from the upper compartment and admitting the steam to the chamber formed by the partitions 3 and 4 in a thoroughly dry, clean condition. The steam passes from this chamber into the inner chamber 4 and thence through the outlet to the engine or other point of consumption, the passage of the steam from one chamber to the other being controlled by the valve 8. The division plate 23, pipes 24 and shields 25 are preferably in a single piece formed in any suitable manner, that preferred being by casting them integral. Thus, it will be seen that the separator consists of but three parts, the upper and lower portions of the casing and the division plate and its coöperating parts, thereby adapting the same to be readily assembled and allowing the ready removal or separation of the parts when it is desired to gain access thereto. Further, it will be seen that by the construction of the separator, the steam is obliged to follow a circuitous route, containing at least four sharp turns, and the velocity of the steam is such that the centrifugal force exerted upon the steam is sufficient to throw off any particles of moisture, oil or other foreign matter which is of greater weight than the dry steam, thereby delivering the steam in a thoroughly dry, clean condition to the engine. I have also provided within the separator itself a receiver adapted to receive the matter separated from the steam and provided with means for maintaining the same at the desired height. And further it will be seen that I have provided means for readily controlling the passage of the steam through the separator and controlling the amount thereof delivered to the engine.

I wish it to be understood that I do not desire to be limited to the exact details of construction shown and described, for obvious modifications will occur to a person skilled in the art.

Having thus fully described my invention, what I claim as new and desire to secure by Letters Patent, is:—

1. In a device of the character described, a casing having a chamber within the same, an inlet in one end of said chamber, a plurality of outlets at the opposite end thereof, pipes mounted within said chamber and in alinement with said outlets, said pipes having their open ends near said inlet and on opposite sides thereof, and shields interposed between said inlet and the open ends of said pipes, substantially as described.

2. In a device of the character described, the combination, with a casing and a partition having an aperture therein and dividing said casing into two compartments, one having a steam inlet and the other a steam outlet, of a pipe secured to said partition in alinement with said aperture and terminating on opposite sides of said partition between said partition and the respective ends of said casing and adapted to convey the steam from one compartment to the other.

3. In a device of the character described, the combination, with a casing and a partition having a plurality of apertures therein and dividing said casing into two compartments, one having a steam inlet and the other a steam outlet, of a plurality of pipes secured to said partition in alinement with the respective apertures and terminating near said inlet and out of alinement therewith and adapted to convey the steam from one compartment to the other, substantially as described.

4. In a device of the character described, the combination, with a casing, a partition having a plurality of apertures therein and dividing said casing into two compartments, one having a steam inlet and the other a steam outlet, of pipes secured to said partition in alinement with said apertures, terminating between said partition and the end of said casing and out of alinement with said inlet, and shields interposed between said inlet and the ends of said pipes, substantially as described.

5. In a device of the character described, a casing and a partition having a plurality of apertures therein and dividing said casing into two compartments, one having an inlet and the other an outlet, and plates secured within said casing on the opposite sides of said inlet and extending into said chamber, of pipes secured to said partition in alinement with said apertures and extending into said chamber beyond the edges of said plates, substantially as described.

6. In a device of the character described, the combination, with a casing, a partition having apertures therein and dividing said casing into two compartments, a pipe secured to said partition and extending into one of said compartments, and means for introducing steam into said compartment between the ends of said pipe, of a vertically extending partition in the other compartment forming a chamber within the same, a pipe secured to the adjacent side of said first-mentioned partition in alinement with said aperture and extending into said last-mentioned compartment to a point below the upper edge of said vertical partition, and an outlet from said chamber, substantially as described.

7. In a device of the character described, the combination, with a casing having an upper and a lower compartment, a pipe connecting said compartments and extending into the same, an inlet to the upper compartment, a shield interposed between said inlet and the adjacent end of said pipe, a partition in said lower compartment forming a chamber and extending above the adjacent end of said pipe, and an outlet for said chamber, substantially as described.

8. In a device of the character described, the combination, with a casing, a partition dividing said casing into an upper and a lower compartment, pipes connecting said compartments and extending on the opposite sides of said partition, an inlet for said upper compartment, and a shield between said inlet and the adjacent ends of said pipes, of vertically extending partitions in said lower compartment forming a chamber between them and extending between the adjacent ends of said pipes, and an outlet connected to the chamber formed by said partitions, substantially as described.

9. In a device of the character described, the combination, with a casing, a partition dividing the same into upper and lower compartments, pipes connecting said compartments and extending on the opposite sides of said partition, an inlet discharging into said upper compartment below the upper ends of said pipes, vertically extending partitions in said lower compartment having a plurality of chambers between them, one of said chambers being in open communication with said lower compartment and another of said chambers having an outlet, and a valve connecting said chambers, substantially as described.

10. In a device of the character described, the combination, with a casing, a partition dividing the same into upper and lower compartments, pipes connecting said compartments and extending on the opposite sides of said partition, an inlet discharging into said upper compartment below the upper ends of said pipes, partitions extending from the bottom of said lower compartment to a point above the lower ends of said pipes and dividing said lower compartment into three parts, said central part comprising two chambers, one in open communication with said lower compartment and the other having an outlet, and a valve controlling the passage of steam from one of said chambers to the other, substantially as described.

11. In a device of the character described, the combination, with a casing, a partition dividing the same into upper and lower compartments, pipes connecting said compartments and extending on the opposite sides of said partition, an inlet discharging below the upper ends of said pipes, vertically extending partitions in said lower compartment extending above the lower ends of said pipes and dividing said compartment into three parts, said partitions having an opening therethrough connecting the two outer parts of said compartment, and an outlet for said central part thereof, substantially as described.

12. In a device of the character described, the combination, with a casing comprising upper and lower parts, a partition dividing said casing into two compartments, and an inlet in the upper part of said casing having downwardly extending shields on the opposite sides thereof, of a vertically extending partition in the lower part of said casing forming a chamber within the same, an outlet for said chamber, and pipes extending through said first-mentioned partition and having their upper ends above the lower edge of said shields and their lower ends below the upper edge of said vertical partition, substantially as described.

13. In a device of the character described, the combination, with a two part casing, one of said parts having an inlet and the other an outlet, an extension for said inlet extending into said casing, and a wall within said casing having a chamber within the same connected with said outlet, of a partition adapted to fit within said casing between said inlet and said outlet, and pipes extending through said partition and extending above the lower edges of said shield and below the upper edges of said wall, substantially as described.

14. In a device of the character described, the combination, with a two part casing, one of said parts having an inlet and the other having an outlet, of a partition adapted to be interposed between said inlet and said outlet, pipes extending through said partition and having their upper ends adjacent to said inlet, and shields carried by said pipes and extending between the same and the end of said casing on the opposite sides of said inlet, substantially as described.

15. In a device of the character described, the combination, with a two part casing having an inlet in one part thereof and an outlet in the other part thereof, of a partition adapted to be interposed between said inlet and said outlet, pipes extending through said partition, shields carried by the upper ends of said pipes extending between the same and the adjacent end of said casing on opposite sides of said inlet, said partition, pipes and shields being formed integral one with the other and separate from said casing, substantially as described.

16. In a device of the character described, the combination, with a two part casing, one of said parts having an inlet and the other having an outlet, of a partition adapted to be interposed between said inlet and said outlet, pipes extending through said partition, shields extending between the upper ends of said pipes and the end of said casing on the opposite sides of said inlet, and a drain pipe extending through said partition, substantially as described.

In testimony whereof, I affix my signature in presence of two witnesses.

GEORGE D. HOPPES.

Witnesses:
  A. C. LINK,
  EDWARD L. REED.